March 17, 1970  R. N. GRISWOLD  3,501,693
OHMMETER FOR MEASURING THE RESISTANCE OF A RESISTOR
CONNECTED ACROSS A PN JUNCTION
Filed March 18, 1966
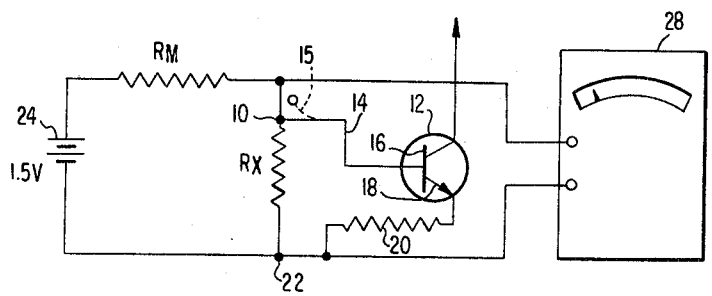
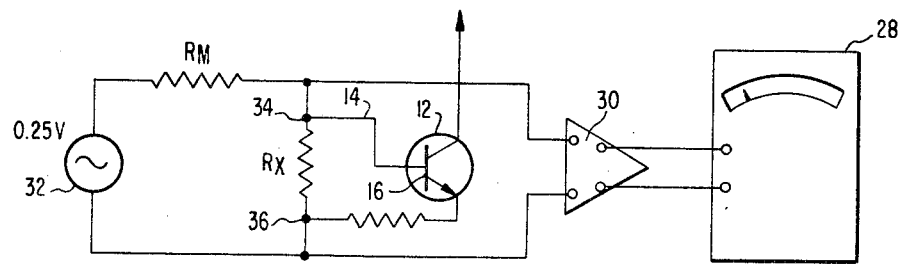
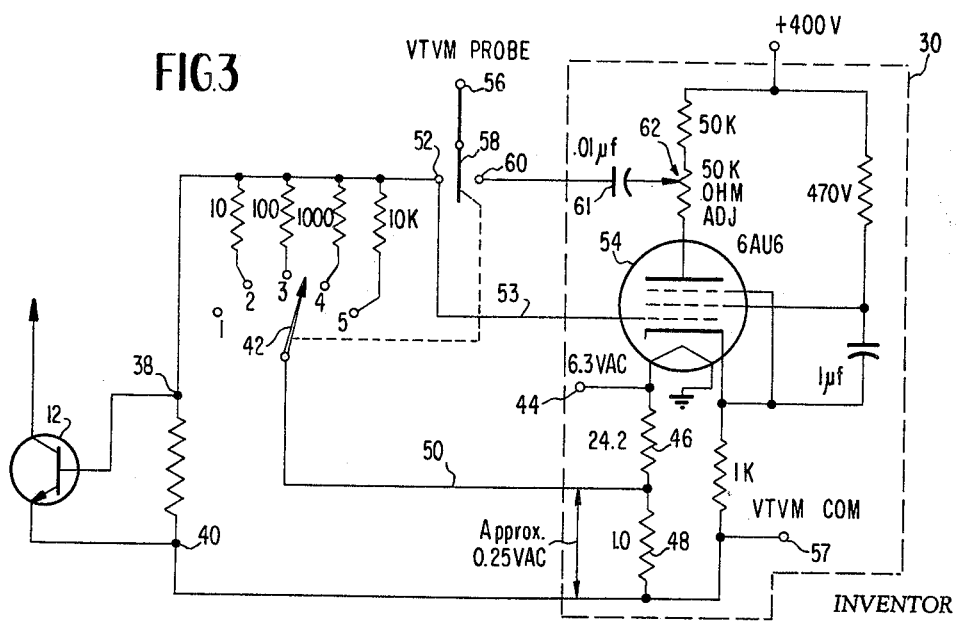
INVENTOR
ROBERT N. GRISWOLD
BY *Sughrue, Rothwell, Mion,*
*Zinn & Macpeak*
ATTORNEYS United States Patent Office 3,501,693
Patented Mar. 17, 1970

3,501,693
OHMMETER FOR MEASURING THE RESISTANCE OF A RESISTOR CONNECTED ACROSS A PN JUNCTION
Robert N. Griswold, Raleigh, N.C., assignor to Corning Glass Works, Corning, N.Y., a corporation of New York
Filed Mar. 18, 1966, Ser. No. 535,409
Int. Cl. G01r 27/02
U.S. Cl. 324—62         5 Claims

ABSTRACT OF THE DISCLOSURE

System and method for measuring the value of an unknown resistance connected in parallel with a semiconductor diode. A low voltage AC source is connected across a voltage divider including a reference connected in series with the parallel combination of the unknown resistor and the diode. The resulting voltage appearing across the diode is so small that the diode remains substantially non-conductive, so that the voltage divider effectively contains only the reference resistor and the unknown resistor. Measurement of the voltage across the unknown resistor determines the resistance thereof.

---

This invention relates to an improved ohmmeter circuit and, more particularly, to an improved means and method for measuring the resistance of a resistor connected in a transistor circuit.

In the past, when trouble shooting an electronic circuit including transistors or other PN junctions, a technician would measure the resistance of an unknown resistor by disconnecting one terminal of the resistor from the circuit so that an ohmmeter connected across the resistor would read the true resistance of the resistor without being affected by the possible shunting effect of PN junctions. This shunting effect is particularly troublesome in direct-coupled transistor circuits. However, with the advent of microminiature circuits, it is often impractical, if not impossible, to disconnect a resistor from the circuit in which it is connected to measure the resistance of the resistor.

Furthermore, using a conventional ohmmeter to measure the resistance of a resistor connected in a transistor or other semiconductor circuit may give an inaccurate reading since the polarity of the D.C. operating voltage of the conventional vacuum tube voltmeter in the ohmmeter may cause the transistor or other PN diode to become conducting. Assuming that the resistor were connected in shunt with the base-emitter diode of such a transistor, one can easily see that the current shunted away from the resistor by conduction of the diode would cause the ohmmeter connected across the resistor to indicate an erroneous value of resistance.

Therefore, the broad object of the invention is to provide an improved method and means for measuring the resistance of a resistor while the resistor is connected in a transistor circuit or other circuit including PN junctions.

A specific object of the invention is to provide a method and means for measuring the resistance of a resistor shunted by the base-emitter junction of a transistor to obtain a true measure of the resistance of the resistor without disconnecting it from the transistor.

A more specific object of the invention is to provide a method and means for measuring the resistance of a resistor shunted by a PN junction by applying to the resistor a voltage of sufficiently low amplitude such that the voltage across the PN junction is insufficient to render the junction conducting, thereby eliminating the shunting effect of the junction.

The foregoing and other objects, features and advantages of the invention will be apparent from the following more particular description of a preferred embodiment of the invention as illustrated in the accompanying drawing.

In the drawing:
FIGURE 1 shows the prior art method of measuring the resistance of a resistor which is connected in a transistor circuit;
FIGURE 2 is a schematic and block diagram of a preferred embodiment of the improved ohmmeter for measuring the resistance of a resistor while it remains connected into a transistor; and
FIGURE 3 is a circuit schematic diagram showing the details of the preferred embodiment of the improved ohmmeter.

In FIGURE 1, there is shown a conventional prior art ohmmeter and the manner in which it is used to measure the resistance of an unknown resistor $R_x$. The upper terminal 10 of resistor $R_x$ is normally connected in a circuit with an NPN transistor 12 so that resistor $R_x$ is shunted by the base-emitter diode of the transistor. Terminal 10 is connected via a lead 14 to the base 16 of transistor 10. The emitter 18 of the transistor is connected via an emitter-follower resistor 20 to the lower terminal 22 of resistor $R_x$.

The ohmmeter itself consists of a 1.5 volt battery 24 and a D.C. vacuum tube voltmeter 28 which includes a multiplier resistor $R_m$. Meter 26 reads full scale at 1.5 volts and is calibrated in ohms.

With such an ohmmeter, it is necessary to disconnect lead 14 from the upper terminal 10 of resistor $R_x$, as shown by the dotted line 15, in order to measure the resistance of resistor $R_x$. If lead 14 were not disconnected, battery 22 would cause a sufficiently large positive voltage to be applied across resistor $R_x$ and the base-emitter junction of transistor 12 to cause the base-emitter junction to become conducting, thereby shunting current away from $R_x$ and causing the D.C. voltmeter to read an erroneous value for the resistance of $R_x$. More specifically, the conduction of the base-emitter junction causes the reading of the ohmmeter to be low. The example given is over-simplified when applied to complicated direct-coupled circuits in which case several PN junctions may shunt resistor $R_x$, thereby causing an extremely large error in the voltmeter reading.

FIGURE 2 shows the manner in which the conventional ohmmeter circuit is modified to permit accurate measurement of the resistor $R_x$ while it remains connected in parallel with the base-emitter junction of transistor 12. Here an A.C. vacuum tube voltmeter 28 is used in conjunction with an A.C. amplifier 30 having a gain of 60. Voltmeter 28 reads full scale at 15 volts A.C. The improved ohmmeter circuit uses a source 32 of approximately 0.25 volt as a reference voltage in place of the 1.5 volt battery 24 illustrated in FIGURE 1. This ohmmeter circuit also includes a multiplier resistor $R_m$.

When it is desired to measure the resistance of the unknown resistor $R_x$, the improved ohmmeter circuit is connected across the terminals 34 and 36 of resistor $R_x$, and the lead 14 is left connected between terminal 34 and the base 14 of transistor 12. The reference voltage is chosen as 0.25 volt A.C. since such a voltage is insufficient to bias the base-emitter diode of transistor 12 into conduction; however, it still causes a detectable voltage drop across resistor $R_x$. Consequently, no current is shunted away from resistor $R_x$ by the base-emitter junction of the transistor and thereby the voltage drop across resistor $R_x$ is accurately proportional to the resistance of $R_x$.

However, since a typical vacuum tube voltmeter does not have sufficient sensitivity to indicate 0.25 volt full scale, the voltage across $R_x$ is first amplified by amplifier 30 before being applied to voltmeter 28. Amplifier 30 has a gain of 60 and therefore voltmeter 28 may be designed or adjusted to read full scale at 15 volts A.C.

FIGURE 3 is a circuit schematic diagram showing the details of the ohmmeter circuit illustrated in FIGURE 2. The ohmmeter is connected across terminals 38 and 40 of an unknown resistor $R_x$. Resistor $R_x$ is connected in parallel with the base-emitter junction of NPN transistor 12. The ohmmeter includes a range switch 42 which has five positions labelled 1, 2, 3, 4 and 5. Position 1 is the OFF position of the ohmmeter whereas positions 2, 3, 4 and 5 correspond to multiplier resistors of 10 ohms, 100 ohms, 1000 ohms and 10,000 ohms, respectively. The reference voltage for the ohmmeter circuit is derived from a 6.3 volt A.C. heater supply connected to terminal 44. Also connected to terminal 44 is a voltage divider consisting of resistors 46 and 48 which are proportioned to provide 0.25 volt A.C. on lead 50 which is connected between switch 42 and the juncture of resistors 46 and 48.

The multipler resistors are connected in common to a terminal 52 which is connected via a lead 53 to the grid of a pentode amplifier tube 54. Tube 54 and its associated circuits form the A.C. amplifier 30 illustrated in FIGURE 2 to provide a gain of 60. Terminals 56 and 57 are the terminals of the vacuum tube voltmeter 28 with terminal 57 being the common terminal and terminal 56 being the probe of the voltmeter. Probe terminal 56 is connected to a switch 58 which in one position is connected to terminal 52 and in another position is connected to a terminal 60 which is connected through a blocking capacitor 61 to the movable arm 62 of an "ohms adjust" potentiometer 62 connected in the plate circuit of pentode 54. Switch 58 is ganged with switch 42 so that switch 58 is connected to terminal 52 when switch 42 is in position 1 (OFF) and connected to terminal 60 when switch 42 is in positions, 2, 3, 4 or 5.

In operation, approximately 0.25 volt A.C. is applied via lead 50 to switch 42 which is connected via one of the multiplier resistors in positions 2, 3, 4 and 5 to terminal 38 of resistor $R_x$. The voltage drop across unknown resistor $R_x$ is insufficient to cause the base-emitter junction of transistor 12 to become conducting. Furthermore, the voltage drop across the unknown resistor $R_x$ appears at terminal 52 which is connected via lead 53 to the grid of pentode amplifier tube 54. This voltage is multiplied by 60 and appears at terminal 60 which is connected to switch 58 to which probe 56 of the vacuum tube voltmeter 28 is applied. Voltmeter 28 indicates the voltage at probe 56 and the scale of the voltmeter may be calibrated to read ohms directly.

It is contemplated that the ohmmeter circuit illustrated in FIGURE 3 be designed as a separate unit which can be used as an adapter for a conventional A.C. vacuum tube voltmeter to provide an improved ohmmeter which will read the true resistance of an unknown resistor shunted by a PN semiconductor junction.

While the invention has been particularly shown and described with reference to a preferred embodiment thereof, it will be understood by those skilled in the art that various changes in form and details may be made therein without deaprting from the spirit and scope of the invention.

What is claimed is:
1. An ohmmeter circuit for measuring the resistance of an unknown resistor while said unknown resistor is connected in parallel with a path including a semiconductor junction formed by two semiconductor regions of opposite conductivity type, said semiconductor being otherwise unbiased and remaining non-conductive for voltages applied across said junction which are less than a predetermined voltage and becoming conductive for voltages across said junction which are greater than said predetermined voltage, comprising:
 (a) an amplifier including at least one vacuum tube having an anode, cathode, control grid, and heater,
 (b) a source of heater voltage connected to said heater,
 (c) means for applying to said unknown resistor and to said parallel path an applied voltage less than said predetermined voltage, said means further comprising:
  (1) a voltage divider connected to said heater and having first and second output terminals,
  (2) a reference resistor connected at one end to said first terminal and at the other end to said control grid, said applied voltage appearing between the other end of said reference resistor and said second terminal, and
 (d) measuring means connected to said anode and said cathode for measuring said applied voltage to determine the value of said unknown resistor, whereby said parallel path appears to be an open circuit for values of applied voltage less than said predetermined voltage, and wherein the only bias across said semiconductor junction is that provided by said applied voltage.

2. An ohmmeter circuit as defined in claim 1 wherein said source of heater voltage is an alternating current voltage source and said amplifier is an alternating current amplifier.

3. An ohmmeter circuit as defined in claim 1 wherein said measuring means is a vacuum tube voltmeter.

4. An ohmmeter circuit according to claim 1 wherein said semiconductor junction is the base-emitter junction of a transistor.

5. An ohmmeter circuit according to claim 1 further comprising:
 (a) a plurality of additional reference resistors of different values each connected at one end to said control grid, and
 (b) switch means for connecting a selected one of said reference resistors to said first terminal of said voltage divider.

References Cited

UNITED STATES PATENTS

| | | | |
|---|---|---|---|
| 2,188,588 | 1/1940 | Antranikian | 324—62 |
| 3,440,530 | 4/1969 | Reich et al. | 324—62 |
| 2,585,121 | 2/1952 | Hartman | 324—62 |
| 2,891,219 | 6/1959 | Camp | 324—62 |
| 3,227,953 | 1/1966 | Cerveny | 324—158 |

OTHER REFERENCES

Graham, R. The CON–VI. in Radio & Television News, October, 1953, pp. 84, 85 and 162, TK 6540.R623.

Thomas, Handbook for Electronic Engineers and Technicians, "Electronic Voltmeters." Prentice-Hall Inc., N.J., TK 7825T5, pp. 171–176.

EDWARD E. KUBASIEWICZ, Primary Examiner

U.S. Cl. X.R.
324—158